Jan. 1, 1929.
C. H. HAGSTEDT
1,697,815
ELECTRICAL CONDUIT COUPLING
Filed April 23, 1926
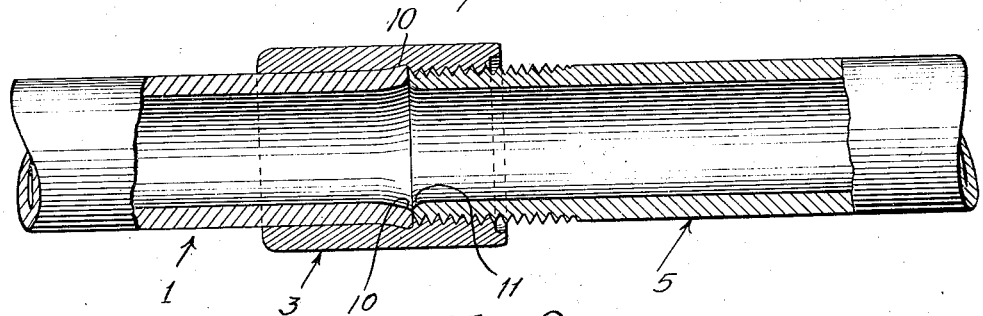
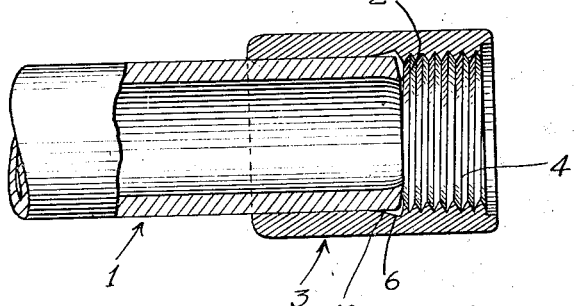
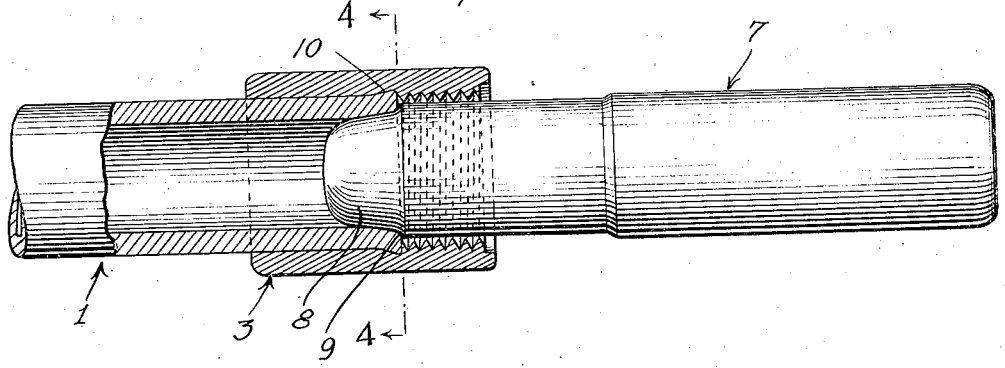
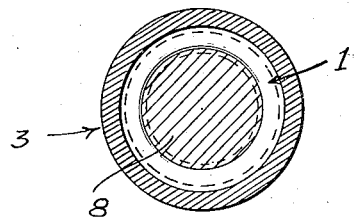
INVENTOR
CHARLES H. HAGSTEDT
BY Moses & Nolte
ATTORNEY Patented Jan. 1, 1929.

1,697,815

UNITED STATES PATENT OFFICE.

CHARLES H. HAGSTEDT, OF NEW YORK, N. Y.

ELECTRICAL CONDUIT COUPLING.

Application filed April 23, 1926. Serial No. 104,006.

This invention relates to conduits for housing electric cables and has for its principal object to provide for connecting the conduit sections inexpensively, with a minimum of parts and labor, and in a manner which assures convenient insertion of the cable without the liability of injury and the consequent danger of fire, due to damaged insulation, when the cable is put into use.

The invention is designed for general use, as in the running of transmission lines and the installation of electrical systems in buildings.

It is customary to install the conduit system of a building or line prior to the insertion of the electrical conductor, as this avoids liability of damaging the conductor insulation during the construction of the building and of the conduit line. When the conduit is complete, a steel cable or "snake" is thrust through the conduit from end to end thereof, the electrical conductor is hooked onto the trailing end of the "snake" and the leading end of the "snake" is then pulled to draw the conductor through the conduit.

It is required, because of the fire risk resulting from damaged insulation, that the pipe sections forming the conduit shall butt and that their ends shall be smooth so as to present no burr or other irregularity likely to cut or otherwise damage the insulation when the cable is drawn through the conduit. The butting of the pipe sections is also important, for the reason that no obstruction should be offered to the thrusting through of the steel cable or "snake" by which the electrical conductors are drawn through the conduit.

The pipe for the conduit is accordingly furnished under specifications requiring that its ends shall be externally threaded and internally reamed, so that they may be connected to a coupling to form a smooth butt joint. These pipe sections, with the usual threaded couplings are suitable for use in many circumstances as when a long, straight line is to be run. They have the drawback, however, that the long pipe sections, and not the short, threaded coupling sleeves, have to be turned in effecting threaded connection.

Then too, it is inevitable in every installation that there will be a certain amount of cutting of the pipe sections to fit. Whenever a pipe is cut it presents an end having no threads on its exterior and having a sharp, inwardly projecting burr. It has been the practice heretofore for the workman to thread this end for the reception of a coupling, and it is a positive requirement that the burr be reamed out. Both of these operations take time and the reaming of the burr is apt to be slighted by a careless workman. As the inner end of the pipe is concealed when installed, it is impossible for the inspector to determine how carefully the reaming has been done. It is also difficult without injury to the line for the inspector to determine whether the pipes have been turned into butting relation, and where such defective work is discovered the remedying of it requires tightening of all the joints along the line, because the tightening of one joint loosens the next.

In accordance with the present invention, these liabilities of defects are completely eliminated, the threading of the cut end of the pipe is made unnecessary, and provision is made for the use of a union coupling in place of the straight, threaded coupling heretofore employed, whereby the junction of the pipes can be effected by turning of the coupling instead of the pipe itself.

Generally stated, this is accomplished by providing a coupling internally threaded at one end but having an unthreaded bore at the opposite end of sufficient diameter to receive the pipe. The unthreaded end of the coupling is inserted onto the unthreaded pipe end until the end wall of the pipe engages the shoulder formed by the innermost thread. A tapered punch is then inserted through the threaded end of the coupling and struck a few sharp blows. This is effective at one operation to eliminate the burr, to compact and harden the pipe end, and to spread the pipe end into a recess in the coupling so as to connect it inseparably to the coupling. Such connection, however, does not prevent the coupling from being turned with reference to the pipe.

The adjoining pipe section may now have its threaded end attached to the threaded end of the coupling, this operation being most conveniently effected by rotating the coupling until the threaded pipe section has been drawn into abutting relation with the end wall of the section having the unthreaded end.

With this method of connection, there is no possibility of the workman's leaving a burr within the pipe because the elimination of the burr is a necessary incident to the expanding of the pipe to connect it to the coupling. It is easy for the inspector to determine whether the pipes have been turned into butting relation simply by applying a wrench to the coupling and undertaking to turn the coupling. If it is found that the pipes have not been caused to butt, the defect can be corrected by turning the coupling at that particular joint without disturbing the connections all along the line.

The union connection thus effected has substantially advantages over the connections heretofore employed in laying a straight line. The pipes can be furnished unthreaded and unreamed at one end and can be connected to the coupling more quickly than by threading. The coupling, being rotatable with reference to the unthreaded pipe, can be connected more conveniently to the threaded pipe end than heretofore. As previously pointed out, defects due to carelessness are eliminated and the job can be inspected more thoroughly. The connection described is of even greater utility in confined spaces, as where the conduit has frequent turns.

It will be evident that two unthreaded pipes may be connected with two couplings, as hereinbefore described, and that the two couplings may then be connected by a nipple with externally threaded ends which should be interiorly beveled to avoid unnecessary wear on a conductor passed therethrough.

In the drawings forming a part of this specification:

Figure 1 is a fragmentary, side elevation, partly in section, showing conduit sections connected in accordance with the present invention;

Figure 2 is a view similar to Figure 1, showing the unthreaded pipe end inserted in the coupling prior to the insertion of the punch for eliminating the burr and spreading the pipe;

Figure 3 is a view similar to Figures 1 and 2 showing the punch in operative position just at the conclusion of its operation; and Figure 4 is a transverse section on the line 4—4 of Figure 3.

In the illustrative embodiment, a pipe section 1 is shown in the condition in which it is left by cutting, there being a sharp, inwardly projecting burr 2 at the cut end. This pipe section 1 is inserted into an unthreaded cylindrical bore of a novel coupling 3, such bore being of a diameter to snugly fit the pipe. The coupling 3 is threaded at one end, as shown at 4, to fit with the threaded end of a pipe section 5. The major diameter of the threaded bore is substantially the same as the diameter of the unthreaded bore so that threaded and unthreaded pipe sections of the same diameter may be inserted, respectively, in said bores.

The minor diameter is necessarily less than the major diameter, however. The innermost thread therefore forms a shoulder for limiting the insertion of the pipe section 1 into the coupling. Between the unthreaded and threaded bores there is provided a shallow, internal, circumferential groove 6 in the coupling. This grove is of maximum depth adjacent the threaded bore of the coupling and gradually diminishes in depth from this part, merging finally in the unthreaded bore of the coupling. Even at its deepest portion the groove is sufficiently shallow to arrest expansion of the pipe end while the end wall projects inward far enough to abut the end wall of a pipe section of the same diameter secured in the coupling. Thus arresting expansion of the pipe end also precludes danger of splitting the pipe in expanding it.

The unthreaded bore is made of substantial length in order to impart the desired rigidity to the joint, while the recess, being shallow, is made relatively narrow in order that the pipe may be expanded with sufficient abruptness to enable a joint of the desired tensile strength to be produced. The unthreaded bore is, therefore, preferably several times as long as the width of the recess. The recess is, nevertheless, made of greater width than depth in order that the external enlargement or collar of the pipe shall not be sheared from the pipe by tensile or bending strains.

With the pipe section 1 inserted to the position shown in Figure 2, a punch 7 having a tapered end 8 that terminates in a merging, rounded shoulder 9 is inserted through the threaded end of the coupling into the pipe section 1. The shank of the punch is of such diameter that it fits the threaded bore of the coupling snugly and forms a guide for the punch. The punch is now struck a few sharp blows. This operation is effective to drive the beveled end of the punch into the pipe end, which results simultaneously in the complete elimination of the burr and the spreading of the pipe end into the annular recess 6. The workman drives the punch until he can tell by the resistance encountered that the expansion is complete. The shoulder 9 is caused to compact, smooth, and harden the metal of the pipe.

The threaded pipe section 5 is now attached to the coupling 3, this being accomplished by threading the pipe into the threaded end of the coupling. Such threading may be effected by holding the coupling stationary and turning the pipe, but it can generally be effected more conveniently by holding the pipe stationary and turning the coupling. This turning is carried on until further turning is positively prevented by the butting of the ends of the pipe sections 1 and 5. Such butting also forces the expanded end of pipe section 1 into firmer engagement with the coupling 3, taking up any slight play which may previously have been present. It will be observed upon examination of Figure 1 that the driving of the punch not only eliminates the burr of pipe section 1, but that it also provides a smooth, slightly beveled interior surface 10 which merges smoothly with the interior beveled surface 11 of pipe section 5.

The coupling is provided with a rabbet 10 at the outer end of the threaded bore to enable the coupling to be driven when necessary without mutilating the coupling threads or obstructing the threaded bore. This feature is claimed in my pending application, Serial No. 257,130, filed Feb. 27, 1928, for electrical conduit couplings.

The coupling 3 is inexpensive, it being simply a straight, non-reducing coupling.

With the construction described, it will be evident that the joint will present no obstruction to the thrusting through of the "snake", and that it will have no burr or other sharp protuberance tending to cut the insulation of the electrical conductor when the latter is drawn through.

As will be obvious, the present invention is applicable to pipes of the character commonly used for electrical conduits, which pipes are of relatively hard metal. The method and construction disclosed are inapplicable to pipes of very soft material, which cannot be strongly united by threaded couplings and which could not be secured to a coupling of the form disclosed with a shallow recess in it by expanding with a punch as the expanded material would offer too little resistance to prevent it from slipping out of the coupling if any force were applied thereto. It will be understood, therefore, that the piping referred to herein is what may be termed hard metal piping which is made of a material of sufficient strength and rigidity so that when the end of the pipe is slightly expanded as described, it will seat itself firmly within the coupling and will resist all the strains which are commonly encountered in electrical conduit work without being pulled out of the coupling. It will also be noted that after it is once expanded by the punch no internal nipple or other auxiliary device is needed to hold it expanded. This is important not only as making the structure simpler and cheaper, but because the presence of any member inside of the conduit would tend to obstruct the same and interfere with the free introduction of the "snake" and the electrical conductors. The pipe is also so firmly held within the coupling that it will permit the screw threaded end of the adajcent pipe to be screwed into firm abutting engagement with it so as to effect a strong and solid connection between the two pipe sections providing for proper electrical contact between them and for a smooth internal finish at the joint as already described.

Variations may be resorted to within the scope of the invention and parts of the improvements may be used without others.

I claim:

1. A coupling having threaded and unthreaded bore portions and a recessed portion, in combination with an unthreaded hard metal pipe of uniform thickness and diameter inserted in the unthreaded portion of the coupling and offset into the recess, to secure said coupling and pipe permanently against longitudinal separation, said pipe having an end face exposed in the bore of the coupling to constitute an end abutment facing the threaded portion of the coupling for impingement of another pipe section of the same diameter thereagainst when the latter is screwed into the threaded portion.

2. A coupling having threaded and unthreaded bore portions and a recessed portion, in combination with an unthreaded hard metal pipe of uniform thickness and diameter inserted in the unthreaded portion of the coupling and offset into the recess to secure said coupling and pipe permanently against endwise separation, an end face of the pipe being exposed in the bore of the coupling to constitute an abutment facing the threaded portion of the coupling, and a threaded pipe of the same diameter as the first screwed into the threaded portion of the coupling with a corresponding end face forced into impinging relation with said abutment, the threaded and unthreaded pipes being formed to present a juncture interiorly devoid of projections.

3. A coupling having a threaded bore portion, an unthreaded bore portion of substantial length, and a recessed portion, in combination with an unthreaded hard metal pipe in the unthreaded portion offset into the recess an amount substantially less than the wall thickness of the pipe to secure said coupling and pipe permanently against endwise separation and having an end face exposed in the bore of the coupling to constitute an end abutment facing the threaded portion of the coupling for impingement of another pipe section of the same diameter thereagainst when the latter is screwed into the threaded portion.

4. In electric conduit construction, a coupling having threaded and unthreaded bore portions and an intermediate recess, in combination with a hard metal pipe inserted in the unthreaded bore portion of the coupling and having its end portion expanded sufficiently to lock it permanently in the recess while leaving an end face which protrudes inward from the recess part way across the bore of the coupling in position to abut the end face of a pipe of the same diameter threaded into the coupling, the inwardly protruding corner between said end face and the inner surface of the pipe being smoothed and rounded.

5. A pipe coupling having a threaded bore portion, an unthreaded cylindrical bore portion, and an intermediate recessed portion, adapted to receive in the unthreaded portion an end of a hard metal pipe and to be secured to the pipe end by expansion of the extremity of the pipe into the recessed portion, the unthreaded cylindrical bore portion of the coupling being of sufficient length to impart substantial rigidity to such connection, and being several times as long as the width of the recessed portion, the recess being of substantially less depth than width to prevent expansion of the pipe to the breaking point but having sufficient depth to enable a strong and permanent interlocking to be effected by expansion of the extremity of the pipe therein.

6. A pipe coupling for electrical conduits, having a threaded bore portion, an unthreaded, cylindrical bore portion, and an intermediate recessed portion, adapted to receive in the unthreaded portion an end of a hard metal pipe, and to be secured to such pipe end by expansion of the extremity of such pipe into the recessed portion, the unthreaded cylindrical bore portion being long enough to impart substantial rigidity to a joint so effected, and the recess being sufficiently abrupt to enable a secure and permanent interlocking of the coupling and such unthreaded pipe end to be effected by such expansion, but being shallow enough to prevent expansion of such pipe end to the breaking point and to arrest expansion of such pipe end with the end face thereof in position for impingement thereagainst of the end face of a threaded pipe of the same diameter as the first pipe, and with the extremity of the interior face of the pipe so little displaced that it may form a joint with such threaded pipe having no abrupt internal unevenness, the major diameter of the threaded bore of the coupling being substantially equal to the diameter of the cylindrical unthreaded bore, but the minor diameter of such threaded bore being less than the diameter of the unthreaded bore so that an unthreaded pipe inserted from the unthreaded end of the coupling may be positively arrested by engagement of the innermost thread with the extremity of such unthreaded pipe to position such extremity adjacent the recess for the expanding operation.

7. The method of securing in butting relation two hard metal pipe sections of equal and uniform diameter to form an electrical conduit, which comprises cutting one of the pipe sections to the desired length, providing a coupling having an unthreaded bore at one end, and an internally threaded bore at the other end, and a circumferential recess between said bores, inserting the cut pipe end in the unthreaded bore of the coupling with its extremity positioned adjacent the circumferential recess, expanding such end into the circumferential recess, but to an extent substantially less than the wall thickness of the pipe section so as to leave the extremity of the pipe section partially exposed within the coupling to form a shoulder, but far enough to effect an interlocking of the pipe section and the coupling strong enough to form a permanent rigid connection for fixing the coupling longitudinally with reference to the pipe section, and, as an incident of such expansion, applying pressure to both the interior and end faces of the pipe section to eliminate the burr formed by cutting, screwing a threaded end of the other pipe section into the threaded bore of the coupling, and relatively turning the coupling and the threaded pipe section until the end wall of the threaded pipe section is drawn into butting relation with the shoulder formed by the exposed portion of the expanded end of the first mentioned pipe section.

In testimony whereof I have affixed my signature to this specification.

CHARLES H. HAGSTEDT.